Sept. 15, 1942.  LE ROY C. VAN GORDEN  2,295,979
STENCILING MACHINE
Filed Aug. 30, 1939    9 Sheets-Sheet 1

Inventor
Leroy C. Van Gorden,
By Charles B. Belknap
Attorney

Sept. 15, 1942. LE ROY C. VAN GORDEN 2,295,979
STENCILING MACHINE
Filed Aug. 30, 1939 9 Sheets-Sheet 2

Inventor
Leroy C. Van Gorden,
By Charles B. Belknap
Attorney

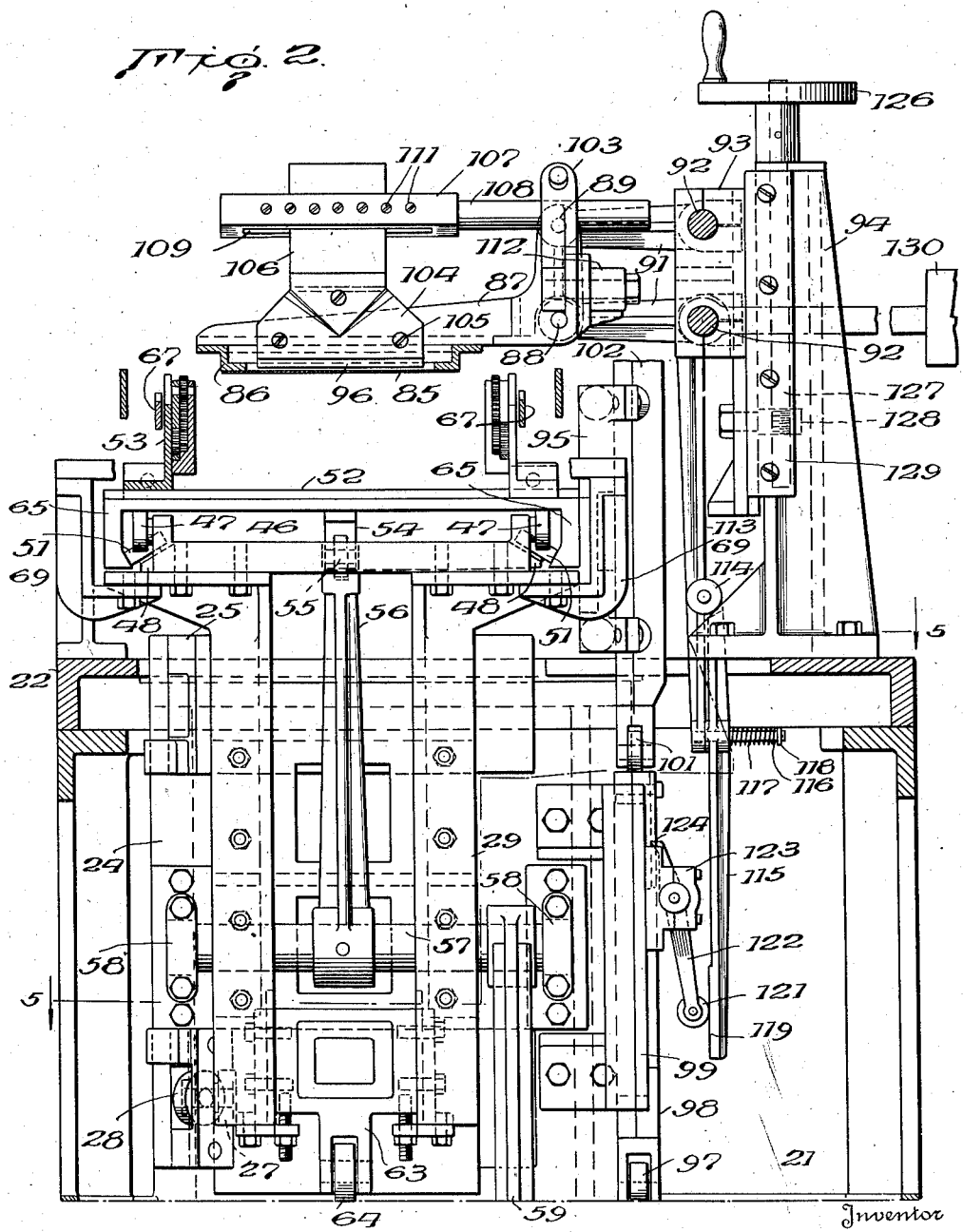

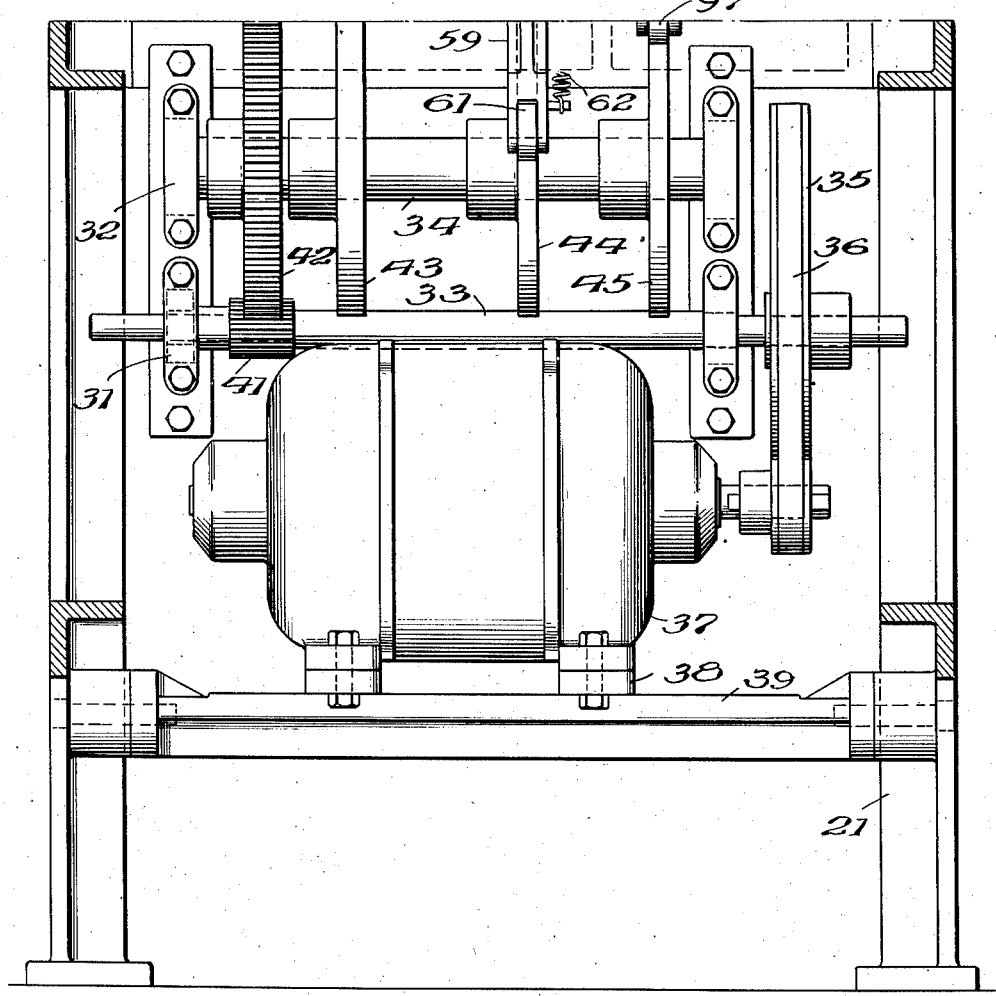

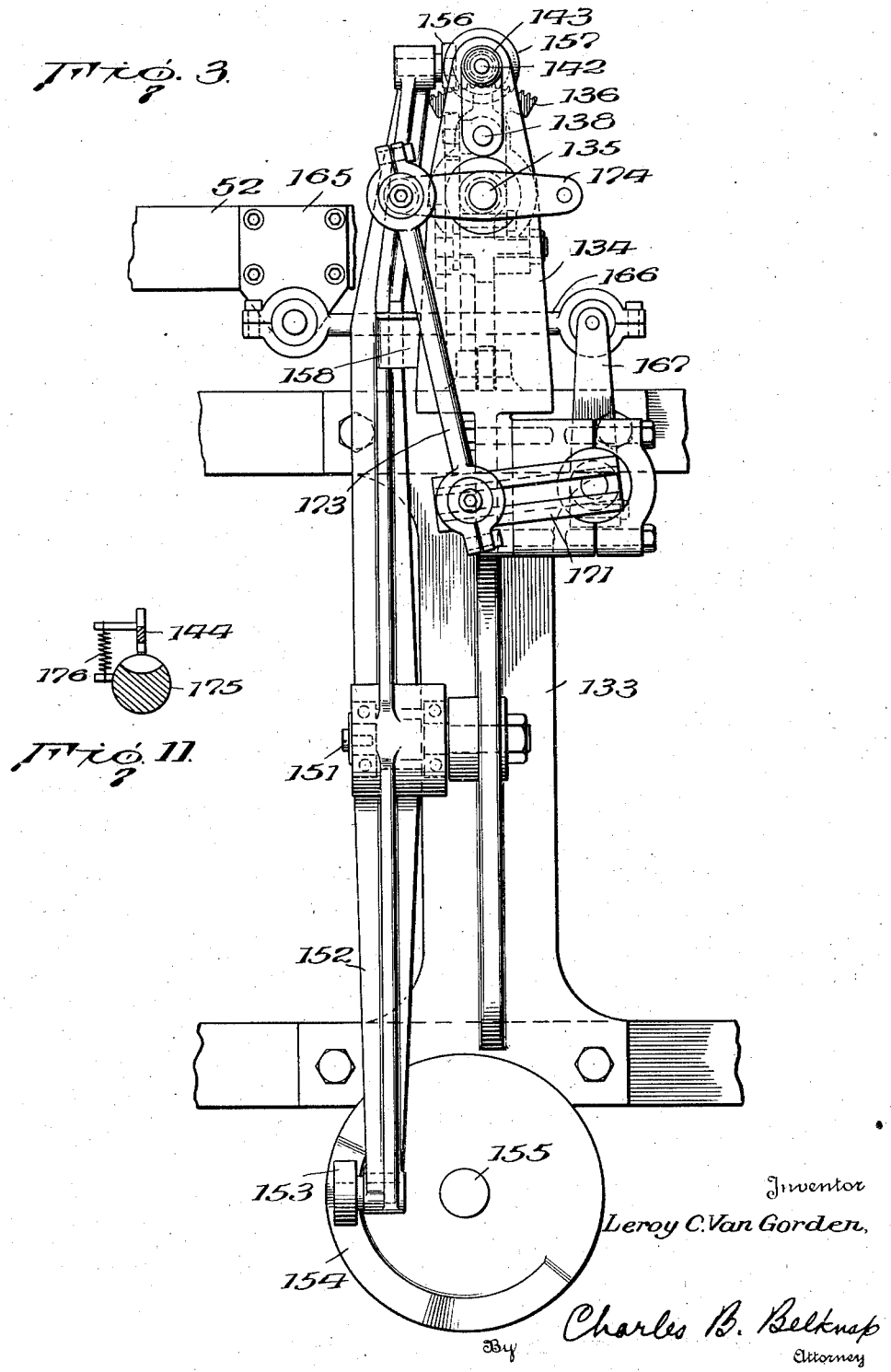

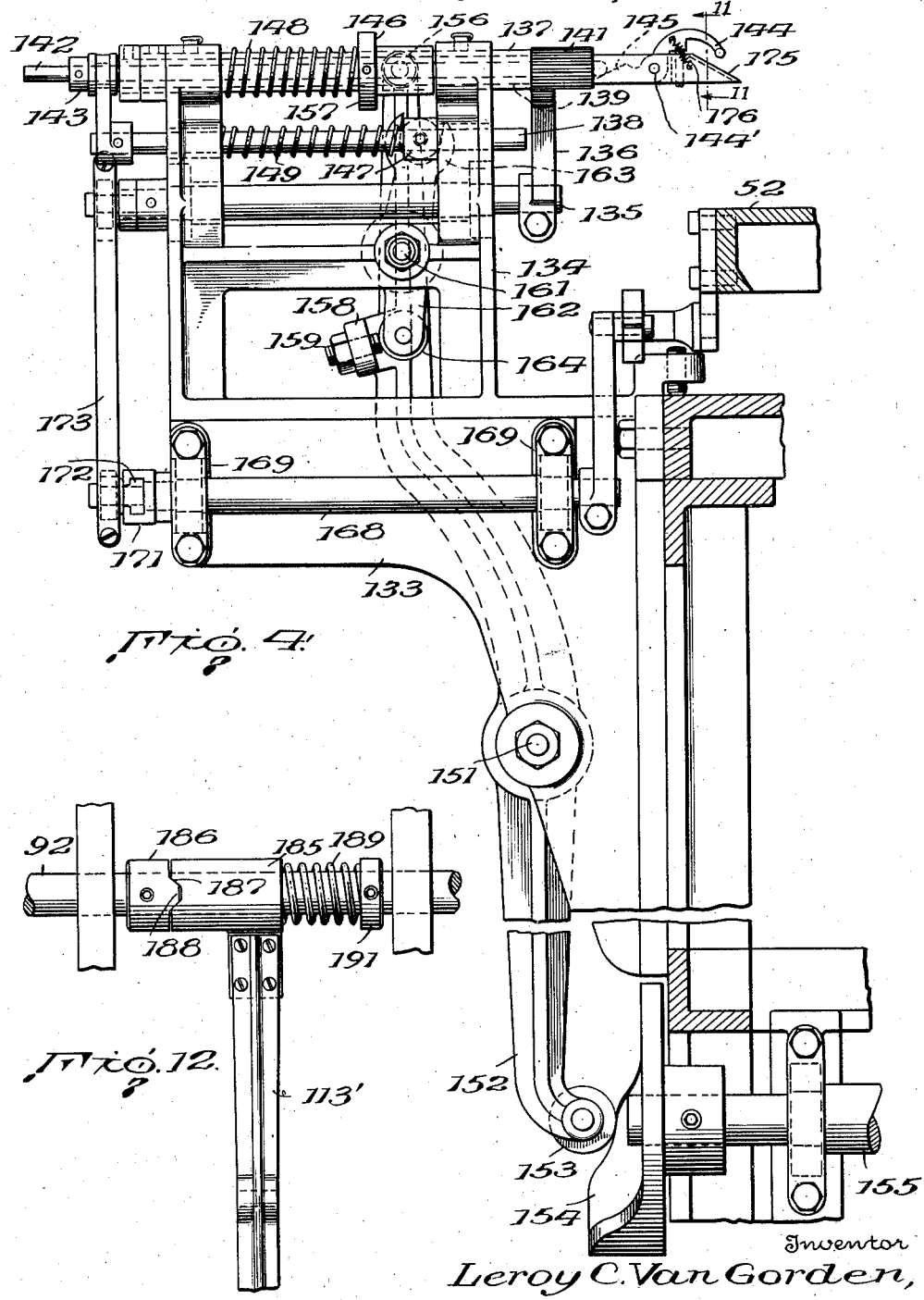

Sept. 15, 1942.　　LE ROY C. VAN GORDEN　　2,295,979
STENCILING MACHINE
Filed Aug. 30, 1939　　9 Sheets-Sheet 7

Inventor
Leroy C. Van Gorden,
By Charles B. Belknap
Attorney

Sept. 15, 1942.   LE ROY C. VAN GORDEN   2,295,979
STENCILING MACHINE
Filed Aug. 30, 1939   9 Sheets-Sheet 8
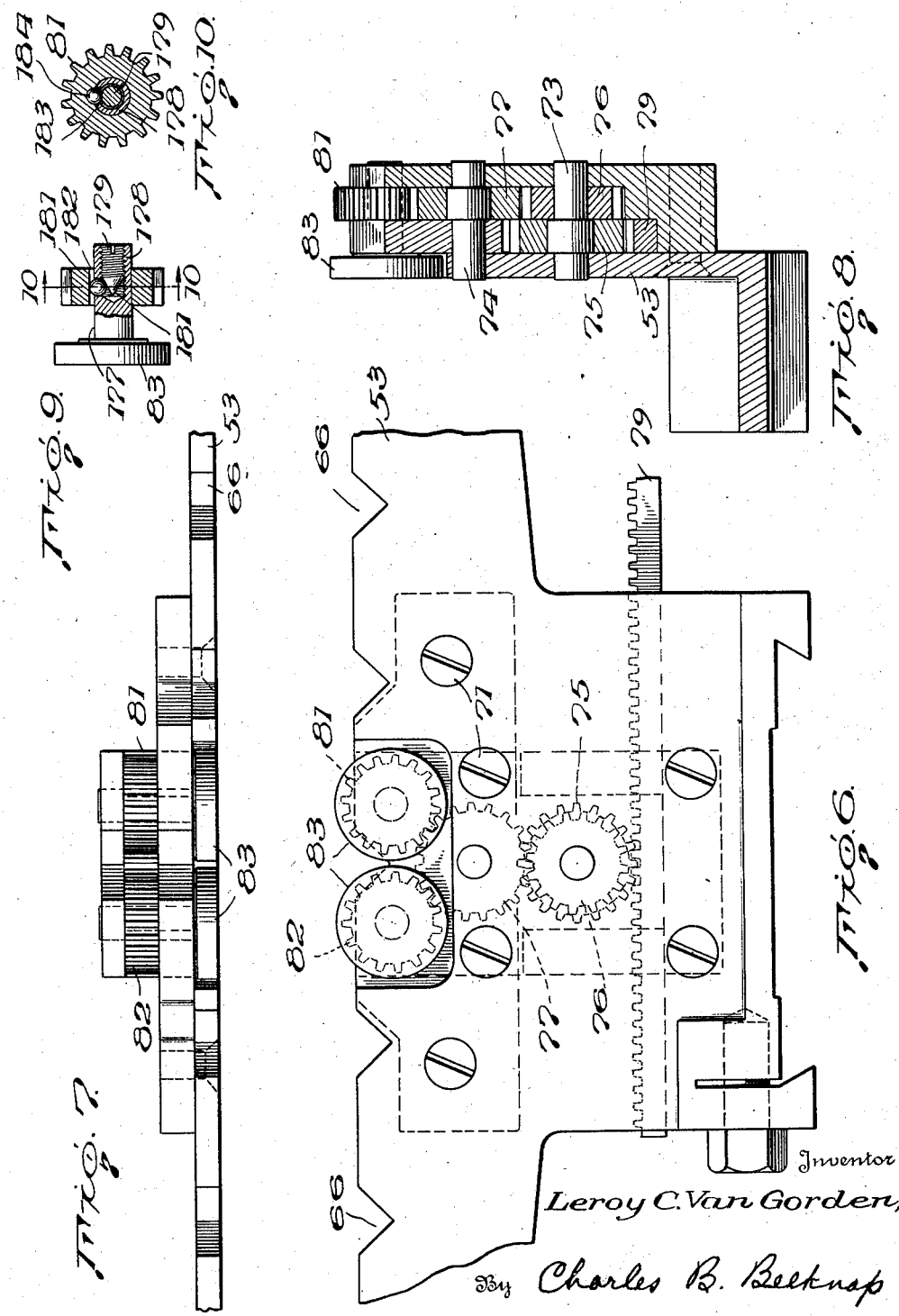
Inventor
Leroy C. Van Gorden,
By Charles B. Belknap
Attorney Sept. 15, 1942. LE ROY C. VAN GORDEN 2,295,979
STENCILING MACHINE
Filed Aug. 30, 1939 9 Sheets-Sheet 9
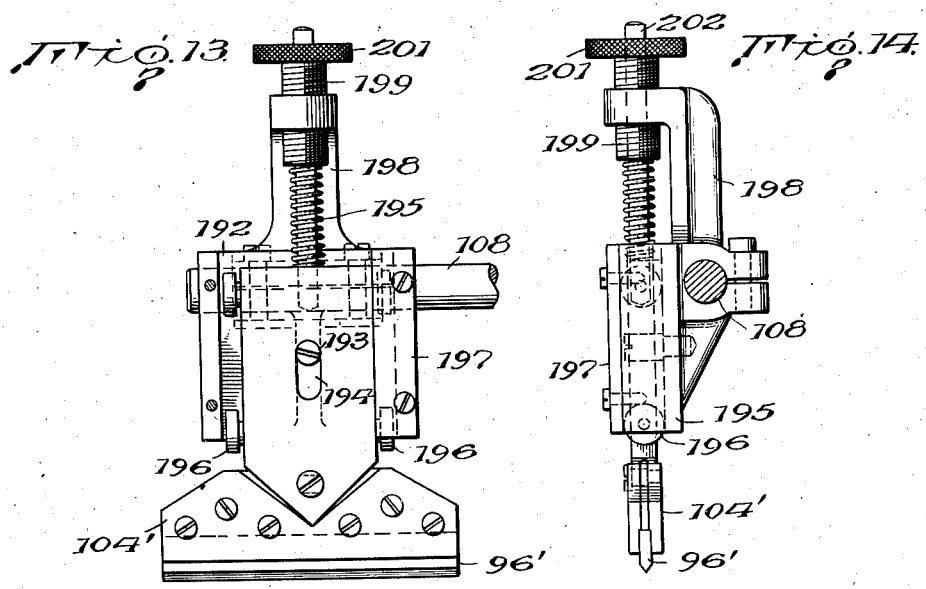
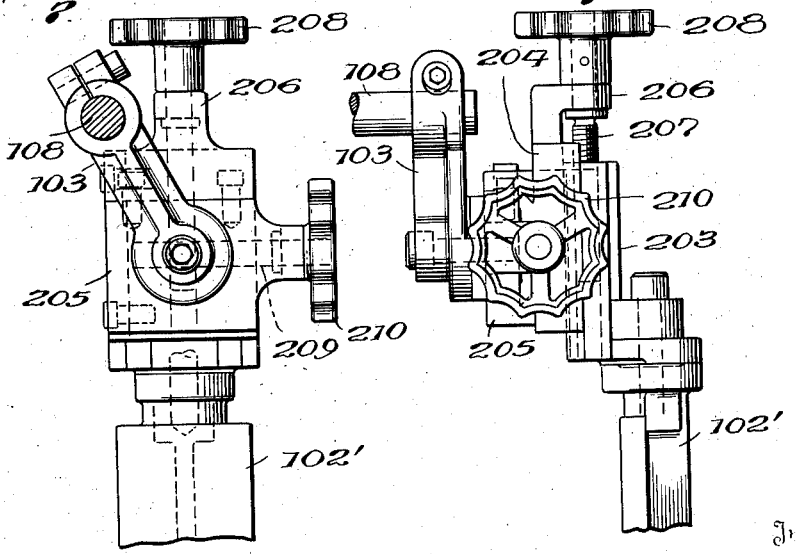
Inventor
Leroy C. Van Gorden,
By Charles B. Belknap
Attorney Patented Sept. 15, 1942

2,295,979

UNITED STATES PATENT OFFICE 2,295,979

STENCILING MACHINE

Le Roy C. Van Gorden, Franklinville, N. J., assignor to Kimble Glass Company, Vineland, N. J., a corporation of Illinois Application August 30, 1939, Serial No. 292,730

13 Claims. (Cl. 101—123)

The present invention relates to a stenciling machine, and more particularly to a machine for printing designs, letters, or similar characters on cylindrical glassware.

In certain types of glass articles such as those used for stirring beverages, the articles are formed from glass rods or tubing, and, in some cases, are provided at one end thereof with a spoon-like portion. In stenciling or transferring printed matter on these articles it is desirable that the matter be placed thereon uniformly, that is, that its relation to the spoon portion be the same on all the articles of a quantity made at one time. It is also desirable that the printed matter bear the same relation to the axis of the rod on all of the articles stenciled.

It is, therefore, one of the objects of the present invention so to position the articles that the printed matter will always appear in the same relation to the spoon portion of the rod or to the axis thereof.

It is a further object of the invention to rotate the glassware in timed relation to its travel with respect to the stencil so that a rolling of the ware with respect to the stencil is effected.

It is another object of the invention to provide a novel form of conveyor means for positioning the ware or tubes in underlying relation to the stencil.

Still another object of the invention is to provide an efficient wiper device for forcing ink through the stencil.

Another object of the invention is to provide means for preventing operation of the wiper except when ware is positioned directly under the stencil.

Other objects will be apparent from the following description of the machine illustrated in the accompanying drawings, in which:

Fig. 2 is a partial side elevation showing the upper part of the machine;

Fig. 2a is a partial side elevation of the lower half of the machine;

Fig. 3 is a front elevation of a turning mechanism for positioning the spoon portion of a glass stirring rod;

Fig. 4 is a side elevation of the turning mechanism illustrated in Fig. 3;

Fig. 6 is a fragmentary enlarged front elevation of the mechanism for rolling the ware in contact with the stencil;

Fig. 7 is a top plan fragmentary view of one of the pair of rolling mechanisms shown in Fig. 6;

Fig. 8 is a section taken on line 8—8 of Fig. 6;

Fig. 9 is a side view partly in section of one of the ware rolling supporting discs;

Fig. 10 is a section taken on line 10—10 of Fig. 9.

Fig. 11 is an enlarged section taken on line 11—11 of Fig. 4;

Fig. 12 is a fragmentary front elevation of a modified form of the latch release operator;

Figs. 13 and 14 are front and side views, respectively, of a modification of the wiper; and Figs. 15 and 16 are front and side views, respectively, of a modified form of the means for adjusting vertically the wiper support.

Figure 1:
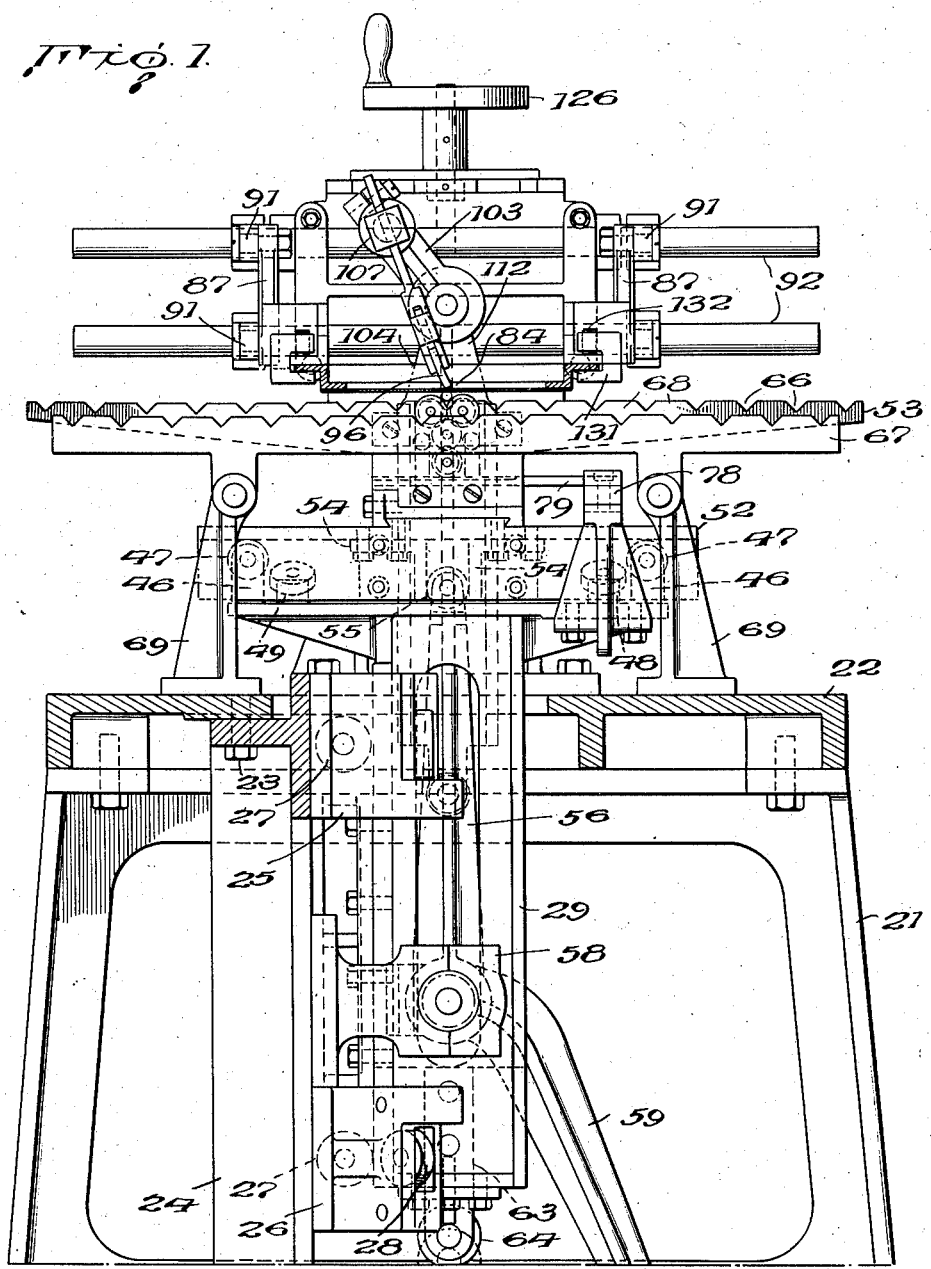
Fig. 1 is a partial front elevation of the machine, the parts shown being the upper half of the machine.

Referring to the drawings, it will be seen that the machine is supported on a base frame 21 having a table portion 22 secured thereto. Fixed to the frame 21 by means of bolts 23 is a sub-frame 24. Fastened to the sub-frame 24 are brackets 25, 26 carrying rollers 27 and 28 forming guides or ways for a vertically reciprocable frame 29. Also secured to the sub-frame 24 are bearings 31 and 32, in which are journaled shafts 33 and 34, respectively.

Keyed or otherwise fixed to shaft 33 is a pulley 35 driven by means of a V-belt 36 from the motor 37 supported by cross-beams 38 and 39. Pinion 41 on shaft 33 meshes with gear 42 fixed on shaft 34, to which shaft are also fixed three cams 43, 44, and 45, the purpose of which will be explained hereinafter.

The machine may be stated as having four principal functions, viz., (1) elevation and transfer of the glass articles; (2) rotation of the articles with respect to the stencil; (3) operation of the stencil and wiper; and (4) position of the ware before printing. The operation of the machine will be described in the order of the functions referred to.

*Transfer and elevation of articles*

Bolted to frame 29 are a pair of members 46 in which are journaled guide rollers 47. Members 48, 49 on which are mounted angle rollers 51 are also secured to frame 29. These rollers serve to guide a horizontally reciprocable bed designated at 52 on which are mounted racks 53 which serve to transfer articles as well as to support the ware turning mechanism to be described in detail hereinafter.

Bed 52 has secured to its under side a pair of angle plates 54 between which roller 55 is disposed. This roller is journaled in the upper end of arm 56, the latter being fast on shaft 57 mounted in bearings 58, these bearings in turn being supported by frame 24. Also secured to shaft 57 is a second arm 59 having a follower 61 at the lower end thereof cooperating with cam 44. Cam 44 is of such form that arm 59 is rocked in a counterclockwise direction, as seen in Fig. 1a, a spring 62 being employed to return it to normal position when the follower engages the lower part of cam 44. The oscillation of arm 59 imparts a similar oscillation to arm 56 so that bed 52 will be reciprocated horizontally.

Secured to frame 29 for vertical reciprocation therewith is a cross piece 63 having a cam follower 64 at the lower end thereof riding on cam 43. The upper end of the frame 29 is attached to member 46 and depending flanges 65 on bed 52 cooperate with rollers 47, 51 so that, when the frame 29 is reciprocated vertically, the bed 52 and rack 53 carrying the ware rotating mechanism are also vertically reciprocated.

Figure 1A:
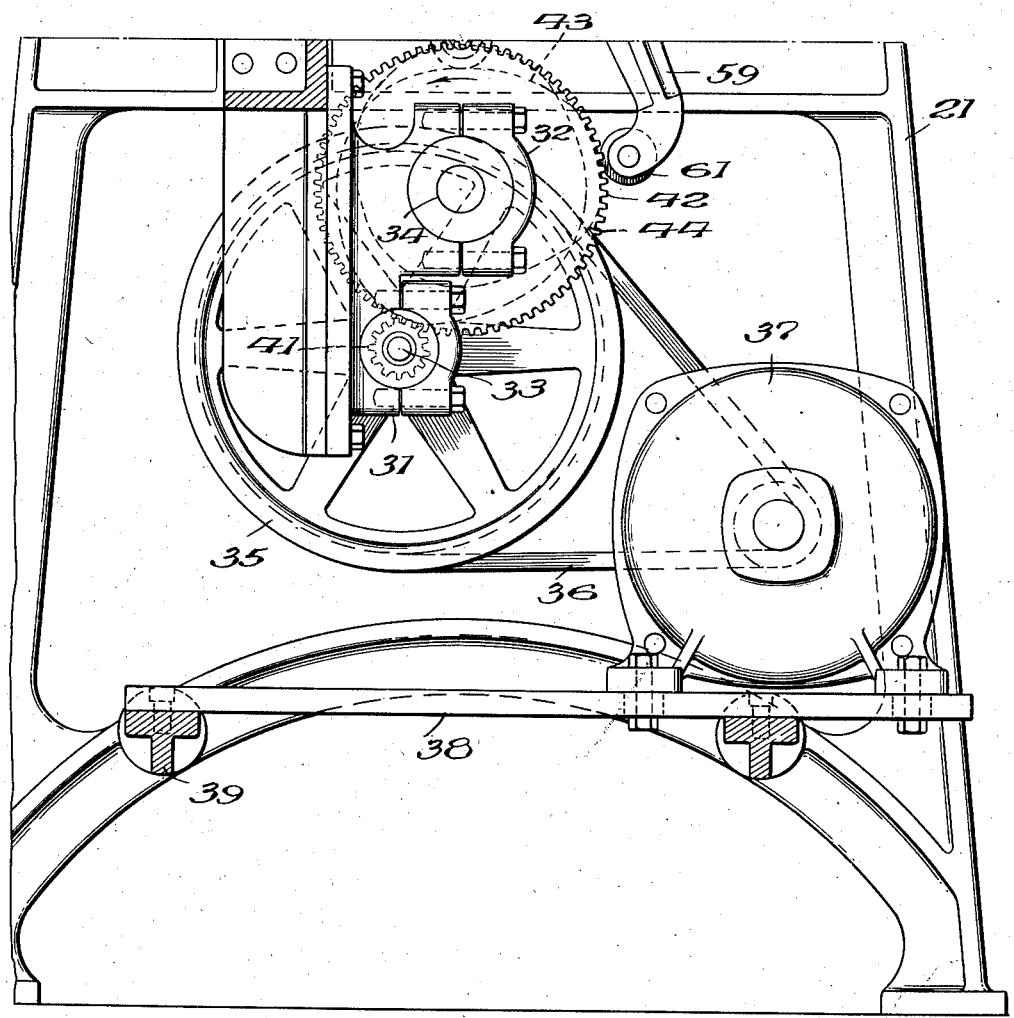
Fig. 1a is a partial front elevation of the machine, the lower half thereof being shown.
Figure 5:
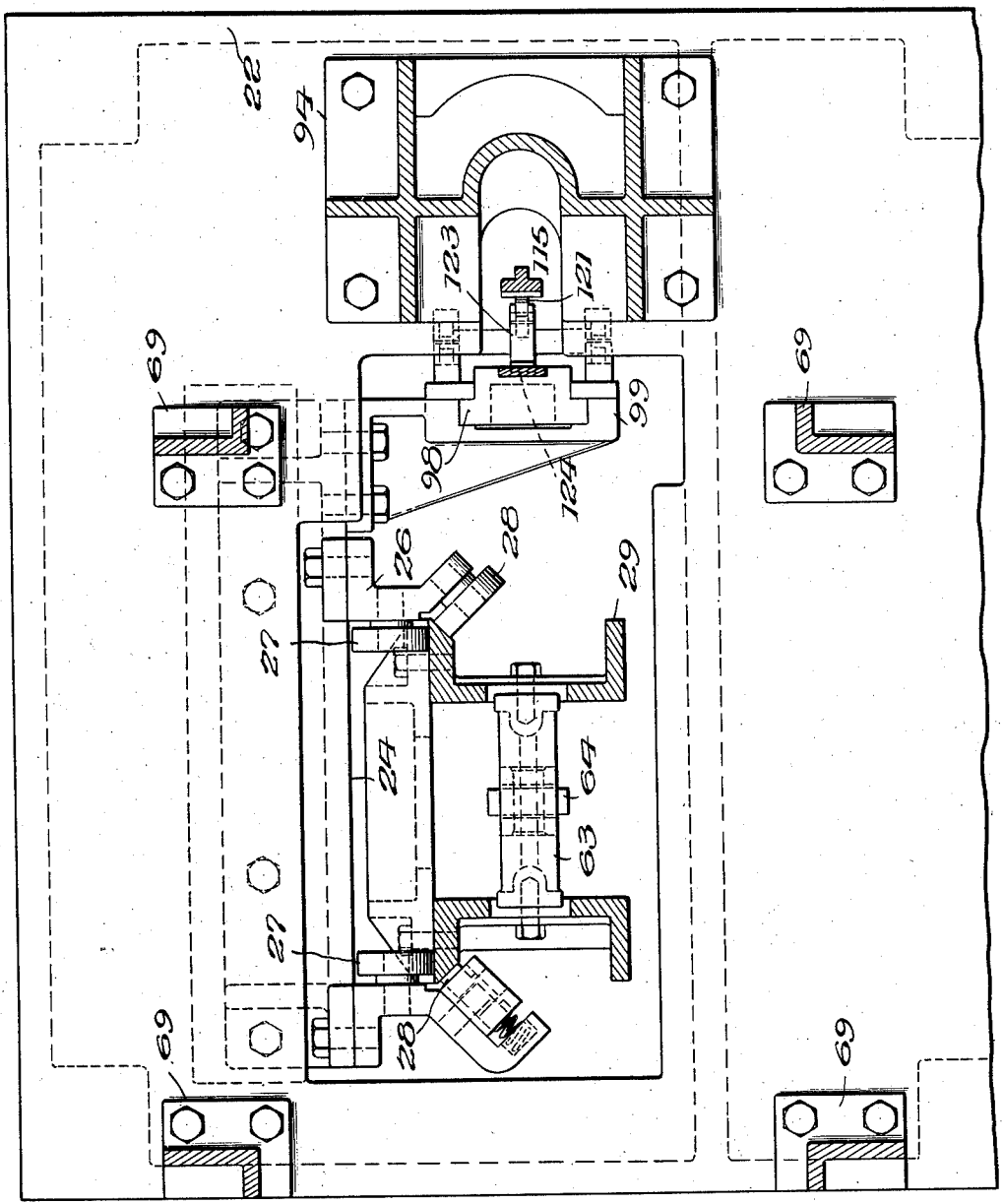
Fig. 5 is a section taken on line 5—5 of Fig. 2.

The mechanism thus far described indicates generally that rack 53 is first elevated by means of cam 43, and then moved horizontally to the left by means of cam 44 and arms 56, 59, as seen in Fig. 1, after which it is lowered when the low part of cam 43 underlies roller 64, and is then returned in a right hand direction to its first position by the spring 62.

It will be seen from Fig. 1 that rack 53 is provided with a series of spaced V-shaped notches 66. A second rack 67 is provided with a series of similarly spaced V-shaped notches 68. While rack 53 is adapted to be reciprocated both vertically and horizontally, rack 67, on the other hand, is stationary, being fixed to standards 69, the latter being secured to bed 22. In Fig. 2 it will be seen that there are a pair of racks 53 and a pair of racks 67 spaced a distance somewhat less than the length of the cylindrical ware upon which the printing matter is to be transferred.

Glass rods are fed to rack 67 from the right end of the machine in Fig. 1, either by a suitable hopper or by the machine operator. The racks 53 are reciprocated horizontally a distance equal substantially to the distance between successive notches therein. Thus it will be seen that as racks 53 are elevated they will lift the ware from rack 67. Then as racks 53 move to the left, they carry the ware a distance equal to the distance between successive notches. As racks 53 are lowered, the glass rods will rest in notches in racks 67. When racks 53 are moved to the right, they are in a lowered position so that the glass rods are not moved thereby, but on the next elevation the ware is again elevated and then transferred horizontally the distance between the recesses. Hence it will be seen that on successive reciprocations of the racks 53 the glass rods are moved successively from one notch to the next adjacent notch on racks 67.

*Ware rotating mechanism*

Fixed to the racks 53 by means of machine screws 71 are bearing plates 72 in which are journaled stub shafts 73, 74, to which are fixed pinions 75, 76, and 77. Bolted to frame 29 is a bracket 78 to which is fixed a stationary rack 79. This rack meshes with pinion 75 so that, when the rack 53 is reciprocated horizontally, pinion 75 is rotated. The rotation of this pinion in turn is imparted to pinions 76 and 77. Meshing with pinion 77 is a pair of pinions 81, 82 to which are secured live rollers 83 adapted to form supports for glass rod 84, as shown in Fig. 1.

At one stage of the transfer operation, the glass rods or stirrers are picked up from racks 67 by the live rollers 83. Then, as the racks 53 are moved to the left in Fig. 1, the glass articles are rotated, it being evident that pinion 75 engaging stationary rack 79 will rotate the supporting rollers 83. The several pinions in the rotating mechanism are so designed that the glass stirrer will have a rolling action with respect to the stencil 85 positioned above the racks, that is, there will be no relative sliding movement between the surface of the stirrer and the face of the stencil. It is to be noted that the article supported by rollers 83 is positioned in a horizontal plane somewhat higher than that in which articles supported in notches 66 are disposed. The purpose of this arrangement will be apparent from further description.

*Stencil and wiper*

Stencil 85, which consists of silk screen having a gelatinous coating, portions of which are removed to form designs or letters, is secured to the under side of an ink pan 86. This pan in turn is fastened to a pair of spaced L-shaped arms 87 pivotally connected at 88 and 89 to parallel arms 91, each of the latter being pivotally mounted on rods 92. The rods 92 are supported in bearings 93 on standard 94, the latter being secured to bed 22. The mounting for the ink pan is pantographic so that the stencil always remains in a horizontal position.

Fastened to the slidable bed 52 is a yoke 95 cooperating with the mounting on which is supported the wiper element 96. The wiper is thus adapted to follow reciprocation of bed 52. Cam 45 on shaft 34 cooperates with the follower 97 on slide member 98, the latter being guided by way 99 secured to sub-frame 24. Slide 98 has a relatively long horizontal upper face serving to act as a guide for roller 101 at the lower end of bracket 102 on which is pivotally mounted arm 103 forming part of the support for the wiper element 96.

The wiper consists of a flexible strip or "squeegee" 96 held in a clamp 104 by means of suitable screws 105, the clamp in turn being secured to a plate 106 slidably mounted in block 107 on arm 108. Block 107 is provided with an elongated opening 109 whereby suitable adjustment of the strip with respect to the block may be made by means of screws 111. As will be seen in Fig. 2, the wiper is adapted to be adjusted vertically as well as horizontally with respect to the block, there being a sufficient number of screws 111 to provide for the desired adjustment. Arm 107 is secured to arm 103, the latter being supported by bracket 112 fixed to post 102. Post 102, on the other hand, is constrained to move with yoke 95 which, as stated before, is fastened to bed 52. Thus, it will be seen that the wiper is reciprocated horizontally with the bed 52 and rack 53, while the stencil 86 is relatively stationary. The wiper is reciprocated vertically by cam 45 being normally held above the stencil in spaced relation thereto.

In Fig. 2 it will be seen that arm 113 is pivotally supported on rod 92 but is, however, fixed to arm 91 to be rocked therewith. Secured to arm 113 and pivoted thereto at 114 is a second arm 115 apertured to receive pin 116 on arm 113. Spring 117 interposed between arm 115 and washer 118 on pin 116 normally urges the arms together, but is adapted to yield when rocking of the arms together is resisted. The lower end of arm 115 is provided with a flat face 119 engaging roller 121 on latch 122. The latch is journaled in bearing 123 on slide 98. The upper end of the latch forms a pawl engageable with a notch 124 in plate 125 fastened to slide 98.

Normally the stencil screen is lowered sufficiently so that the wiper strip 96 is spaced from the screen. The ware or stirrers, when elevated by the live rollers 83, will lift the screen to contact the wiper, the latter being lowered at this time by cam 45. The position of the screen may be adjusted for various sizes of ware by wheel 126 and worm 127 which elevates or lowers the rods 92 by means of nut 128 secured to the pan supporting slide 129, thus fixing the lower limit of the screen. A counterweight 130 is connected to arm 91 to provide for easy elevation of the ink pan. When the ware lifts the screen, arms 113 and 115 are rocked therewith in a clockwise direction in Fig. 2, this rocking movement releasing latch 122 from notch 124 to permit slide 98 and the wiper supporting arm to be lowered by their own weight. Then, upon horizontal movement of the bed 52 and the ware rotating rollers, the wiper forces ink through the uncoated portions of the stencil screen. It is to be noted that the wiper is positioned directly over the ware as the latter rolls in contact with the stencil and that the wiper and ware maintain this relation at all times during the transfer of ink to the ware.

As stated hereinbefore, the ware supported by rollers 83 is at a somewhat higher level than that in the notches 66. If for some reason there is no ware in the support formed by the rollers 83, the ink pan will not be engaged and will therefore remain in its lowermost position. This position is such that the ware in notches 66 will not rise sufficiently to raise the stencil screen. Hence, the latch 122 will not be released and the screen will remain above the ware in notches 66 but spaced therefrom so that there will be no engagement of the remaining ware and the screen. Likewise the screen will not be elevated to engage wiper strip 96, thus inhibiting passage of ink through the screen. By so controlling the elevation and lowering of the screen, there is no waste of ink and smudging in subsequent transfers is obviated.

The ink pan is removably supported in a pair of opposite channels 131 on arm 87, being held therein by screws 132. It is apparent that the screen may be removed for cleaning or replaced by another screen when desired.

Ware turning mechanism

When the stirrers to which designs are to be transferred are provided with a spoon portion at one end thereof, it is desirable that they be positioned in the racks in the same relation to each other previously to the printing operation, preferably with the open side of the spoon facing upward. For the purpose of so turning the stirrers the following mechanism is provided. Attached to the front of the bed frame 21, 22 is a sub-frame 133 supporting thereabove a bracket 134. Journaled in bracket 134 is a shaft 135 having fixed thereto a gear segment 136. Also mounted in the bracket is a sleeve 137 and rod 138, the latter being reciprocable with respect to the bracket. Sleeve 137 serves as a guide for the plunger 139 having a circumferential toothed portion 141 adapted to mesh with segment 136. A portion of plunger 139 is also made hollow to accommodate a clamp operating rod 142 to which is fixed a collar 143. Pivoted at 144' near the end of plunger 139 is a clamping finger 144 having a cam portion 145 thereon adapted to be engaged by the end of operating rod 142. Plunger 139 and rod 138 have attached thereto collars 146, 147, respectively. Springs 148, 149 are interposed between collars 146, 147, and the bracket 134.

Pivoted at 151 to sub-frame 133 is a rocker 152 having a roller 153 at one end thereof cooperating with cam 154. This cam is on shaft 155 which may be an extension of shaft 34. At the upper end of rocker 152 is a roller 156 cooperating with flange 157 on collar 146 to move plunger 139 to the left as seen in Fig. 4. A lateral lug 158 on the rocker accommodates an adjustable screw 159. Pivoted at 161 on the bracket is a forked lever 162 having a furcated portion 163 at its upper end and a roller 164 at its lower end, this roller normally abutting screw 159.

As will be seen in Figs. 3 and 4, there is bolted to bed 52 a plate 165 to which is pivotally connected a link 166, the other end of which is pivotally connected to arm 167. Shaft 168 is journaled in bearings 169 secured to the side of sub-frame 133, arm 167 being fastened to one end of this shaft. At the other end of shaft 168 there is fixed thereto a slide piece 171 forming a guide for T-head 172 at one end of connecting link 173. The other end of this link is pivotally connected to arm 174 fixed on shaft 135. With this arrangement it will be obvious that when bed 52 is reciprocated horizontally, arm 174 will be rocked resulting in oscillation of segment 136 and plunger 139.

In the operation of the ware turning mechanism, plunger 139 is retracted and then advanced toward a spoon resting on racks 67. The end of the plunger is beveled and concave, as shown at 175 in Fig. 11. As the plunger is advanced the concave end is turned with its concave face presented in a downward direction. Then as the concavity overlies the spoon end, the bed 52 moves to the right, rack 53 being positioned below rack 67. At the same time plunger 139 is rotated to right the spoon and so that the concave face thereof is presented upwardly. While the plunger alone is capable of righting most types of spoons, finger 144 supplements the concave face of the plunger by clamping the spoon to the plunger. This finger is normally held in clamping position by a spring 176, but, when lever 162 is rocked by spring 149, the operating rod is moved forwardly to release the finger and permit retraction of the plunger without drawing the stirrer from the racks. It is apparent that spring 148 advances collar 146 and plunger 139 to which the collar is fixed until the collar abuts the forward bearing in bracket 134. Rocker 152 continues its forward movement thereafter to rock lever 162. It is to be understood that the cam 154 is so designed that reciprocation of the plunger and release of the clamping finger are timed to right the spoon previously to its transfer to the rollers 83.

One means for securing the live rollers 83 to gears 81, 82 is shown in Figs. 9 and 10. Gears 81 and 82 are drilled to receive the shaft 177 of roller 83, the shaft being tapped, as at 178, to receive screw 179 having a conical end 181. A keyway 182 in the gear and aperture 183 in the pintle receive ball 184. It is apparent that the conical end of the screw engaging the ball locks the gear to the pintle and that by the turning of the screw the gear may be loosened to adjust the live roller with respect to the gear.

In Fig. 12 a modified form of the latch operating arm is illustrated. Arm 113' is adapted to engage latch 122 and is secured to collar 185 mounted loosely on rod 92. A second collar 186 is fixed to rod 92, to which is also fastened the arms of the ink pan. It will be seen that collar 185 is notched at 187 to receive a cam portion 188 on collar 186 and that the collar 185 is normally urged toward collar 186 by spring 189 abutting collar 185 and washer 191 fixed to rod 92. Thus a yielding connection between rod 92 and arm 113' is provided.

In Figs. 13 and 14 there is shown a modification of the wiper device. In this form the wiper is vertical and is provided with a yieldable mounting to regulate the pressure of the wiper on the screen. The wiper strip 96' is held in clamp 104', the latter being held on plate 192 by a pin and slot connection as shown at 193, 194. Plate 192 is fixed to rod 108 suitably supported by arm 103. Clamp 104' is provided at its sides with rollers 196 which are guided by ways 197 on plate 192. A threaded bore in upstanding bearing 198 accommodates an exteriorly threaded sleeve 199 having a knurled head 201 thereon. Guide rod 202 is secured to clamp 104' and passes through sleeve 199. Spring 195 surrounding the guide rod abuts against the threaded sleeve and the clamp to urge the wiper downwardly as far as the pin and slot connection permits. Pressure on spring 195 may be adjusted by turning sleeve 199 so that the wiper will yield when the screen is pressed thereagainst, it being apparent that, depending on the compression of the spring, the wiper will brush more or less ink through the screen.

In Figs. 15 and 16 a modified form of adjustment for the wiper is illustrated. It will be seen that post 102' supports bracket 203, the latter having a guideway in which slide 204 is mounted for vertical adjustment. Slide 204 is provided with a horizontal guide on which is slidably mounted block 205 adapted to be adjusted horizontally thereon. Slide 204 has formed therewith a lateral apertured portion 206 accommodating an adjusting screw 207 at the upper end of which is a hand wheel 208 fixed to the screw. Block 205 is adjustable horizontally by means of a screw 209 threaded in slide 204 and having hand wheel 210 thereon. Arm 103 is fixed to block 205. It is apparent that the wiper is adjustable both horizontally and vertically to position the wiper for various sizes of ware and stencils.

While the invention has been illustrated in some detail and with respect to a particular embodiment thereof, it is not intended that its operation and parts be limited to the steps and parts described, but is susceptible of modification within the terms of the following claims.

What is claimed is:

1. In a machine for printing on cylindrical glass ware, an ink pan having a stencil thereon and a wiper for forcing ink through said stencil, means for pivotally supporting said ink pan, means for elevating the ware to engage the underside of said stencil and lift the stencil into engagement with said wiper, a pair of supports for the ware, each of said supports comprising a pair of adjacent rollers, and means for moving said supports transversely with respect to the axis of the ware, said wiper being positioned directly over said ware while the ware is moved in engagement with the stencil.

2. In a machine for printing on cylindrical glass ware, an ink pan having a stencil thereon and a wiper for forcing ink through said stencil, means for pivotally supporting said ink pan, counterbalancing means for said pan, means for elevating the ware to engage the underside of said stencil and lift the stencil into engagement with said wiper, and a horizontally reciprocable carrier for supporting and rolling said ware in contact with said stencil, said wiper being horizontally reciprocable and positioned directly over said ware while the ware is being rolled.

3. In a machine for printing on cylindrical glass ware, an ink pan having a stencil thereon and a wiper for forcing ink through said stencil, means for pivotally supporting said ink pan, means for elevating the ware to engage the underside of said stencil and lift the stencil into engagement with said wiper, a pair of spaced supports for the ware, each of said supports comprising a pair of adjacent rollers, means for moving said supports and said wiper transversely with respect to the axis of the ware, said wiper being positioned directly over the ware while the ware is in engagement with said stencil, and means for positively rotating said rollers during said transverse movement.

4. In a machine for printing on cylindrical glass ware, an ink pan having a stencil thereon and a wiper for forcing ink through said stencil, means for pivotally supporting said ink pan, means for elevating the ware to engage the underside of said stencil and lift the stencil into engagement with said wiper, a pair of spaced supports for the ware, each of said supports comprising a pair of adjacent rollers, means for moving said supports and said wiper transversely with respect to the axis of the ware, said wiper being positioned directly over the ware while the ware is in engagement with said stencil, gearing for rotating said rollers, and a stationary toothed rack engageable with said gearing for rotating said gears during said transverse movement.

5. In a machine for printing on cylindrical glass ware, an ink pan having a stencil thereon and a wiper for forcing ink through said stencil, means for pivotally supporting said ink pan, means for elevating the ware to engage the underside of said stencil and lift the stencil into engagement with said wiper, means for rolling said ware in contact with said stencil, said wiper being positioned directly over said ware while the ware is being rolled, means for maintaining said wiper in an elevated position out of engagement with the stencil, and means responsive to engagement of the ware with said stencil for releasing said last-mentioned means to permit lowering of the wiper into engaging relation with said stencil.

6. In a machine for printing on cylindrical glass ware, an ink pan having a stencil thereon and a wiper for forcing ink through said stencil, means for pivotally supporting said ink pan, means for elevating the ware to engage the underside of said stencil and lift the stencil into engagement with said wiper, means for rolling said ware in contact with said stencil, said wiper being positioned directly over said ware while the ware is being rolled, means for elevating the wiper, latch means for maintaining said wiper in elevated position and out of engagement with the stencil, and means responsive to engagement of the ware with said stencil for releasing said latch means to permit lowering of the wiper into engaging relation with said stencil.

7. In a machine for printing on cylindrical glass ware, an ink pan having a stencil thereon and a wiper for forcing ink through said stencil, means for pivotally supporting said ink pan, means for elevating the ware to engage the underside of said stencil and lift the stencil into engagement with said wiper, means for rolling said ware in contact with said stencil, said wiper being positioned directly over said ware while the ware is being rolled, means for elevating the wiper, latch means engageable with said wiper elevating means to maintain said wiper in elevated position out of engagement with said stencil, and means operated by movement of the stencil toward said wiper for releasing said latch means only when said stencil is lifted by ware engaging the stencil.

8. In a machine for printing on cylindrical glass ware, an ink pan having a stencil thereon and a wiper for forcing ink through said stencil, means for pivotally supporting said ink pan, means for elevating the ware to engage the underside of said stencil and lift the stencil into engagement with said wiper, a pair of spaced supports for the ware, each of said supports comprising a reciprocating notched bar, a pair of spaced supplemental supports on said bars having means for rotating ware on the supplemental supports, and means for successively advancing ware on said bars from notch to notch and to the supplemental supports.

9. In a machine for printing on cylindrical glass ware, an ink pan having a stencil thereon and a wiper for forcing ink through said stencil, means for pivotally supporting said ink pan, means for advancing the ware to engage said stencil including a pair of parallel stationary notched racks and a pair of movable notched racks parallel to the stationary racks, means for reciprocating said movable racks both horizontally and vertically to advance the ware from one notch to an adjacent notch on the stationary rack, and means on one of said racks for supporting and rotating the ware.

10. In a machine for printing on cylindrical glass ware, an ink pan having a stencil thereon and a wiper for forcing ink through said stencil, means for pivotally supporting said ink pan, means for elevating the ware to engage the underside of said stencil and lift the stencil into engagement with said wiper, a pair of spaced supports for the ware, each of said supports comprising a reciprocating notched bar, a pair of spaced supplemental supports on said bars having means for rotating ware on the supplemental supports, and means for successively advancing ware on said bars from notch to notch and to the supplemental supports, said supplemental supports being disposed in a plane higher than that of said notches, said stencil being engaged only by the ware supported in said supplemental supports.

11. In a machine for printing on glass ware having a cylindrical handle portion and a non-cylindrical portion at the end thereof, an ink pan having a stencil thereon and a wiper for forcing ink through said stencil, a reciprocable plunger having its end bevelled to engage the non-cylindrical portion of the ware, means supported on the machine for moving said plunger axially away from and out of engaging relation with the ware, means for moving said plunger into engagement with the ware, means for thereafter rotating the plunger to turn the ware to a predetermined position with respect to said stencil, and means for thereafter moving said ware to bring the cylindrical portion of the ware into rolling engagement with said stencil.

12. In a machine for printing on glass ware having a cylindrical handle portion and a non-cylindrical portion at the end thereof, an ink pan having a stencil thereon and a wiper for forcing ink through said stencil, a reciprocable plunger having a beveled end, clamping means on said plunger and cooperating with said beveled end to engage the non-cylindrical portion of the ware, means for moving said plunger and said clamping means into engagement with the ware, means supported on the machine for moving said plunger axially away from and out of engaging relation with the ware, means for thereafter rotating the plunger to turn the ware to a predetermined position with respect to said stencil, and means for thereafter moving said ware to bring the cylindrical portion of the ware into rolling engagement with said stencil.

13. In a machine for printing on glass ware having a cylindrical handle portion and a non-cylindrical portion at the end thereof, an ink pan having a stencil thereon and a wiper for forcing ink through said stencil, a transfer and ware supporting mechanism including a pair of stationary notched racks and a pair of notched bars, said bars being movable horizontally in a plane above said racks to roll the ware supported thereon and movable horizontally in the opposite direction and in a plane below said racks to deposit ware on said racks, means engageable with the non-cylindrical portion of the ware for turning the ware to position the non-cylindrical portion in predetermined relation to said stencil, and means actuated by said reciprocable bars for rotating said turning means while the ware is deposited on the stationary racks.

LE ROY C. VAN GORDEN.